US009866885B2

(12) United States Patent
Chow et al.

(10) Patent No.: US 9,866,885 B2
(45) Date of Patent: *Jan. 9, 2018

(54) SYSTEM AND METHOD OF RESTRICTING ACCESS TO MEDIA CONTENT

(71) Applicant: AT&T INTELLECTUAL PROPERTY I, L.P., Atlanta, GA (US)

(72) Inventors: Lee Chow, Naperville, IL (US); David Piepenbrink, Chicago, IL (US); Stephen Rys, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/543,208

(22) Filed: Nov. 17, 2014

(65) Prior Publication Data
US 2015/0074707 A1 Mar. 12, 2015

Related U.S. Application Data

(63) Continuation of application No. 11/933,502, filed on Nov. 1, 2007, now Pat. No. 8,924,997.

(51) Int. Cl.
*H04N 7/16* (2011.01)
*H04N 21/258* (2011.01)
(Continued)

(52) U.S. Cl.
CPC ....... *H04N 21/25816* (2013.01); *H04L 63/10* (2013.01); *H04N 7/1675* (2013.01);
(Continued)

(58) Field of Classification Search
None
See application file for complete search history.

(56) References Cited

U.S. PATENT DOCUMENTS 5,036,537 A 7/1991 Jeffers et al.
5,416,508 A 5/1995 Sakuma et al.
(Continued)

OTHER PUBLICATIONS

"Blackout (Broadcasting)," Wikipedia, http://en.wikipedia.org/wiki/Blackout_%28broadcasting%29, Feb. 5, 2007, pp. 1-3.
(Continued)

*Primary Examiner* — Jason K Lin
(74) *Attorney, Agent, or Firm* — Toler Law Group, PC (57) ABSTRACT

A method includes receiving, at a service delivery platform from a first video source, a control stream associated with primary media content delivered via a video distribution network, where the control stream includes conditional access information associated with a second video source, wherein the conditional access information of the control stream indicates a restriction of the primary media content. The method also includes creating a substitution table, at the service delivery platform, based on the conditional access information including an indication of a geographic area, where the substitution table correlates the primary media content with substitute media content of the second video source, and when the restriction prevents access to the primary media content, the substitute media content is provided via the video distribution network. The method further includes sending the substitution table to the second video source.

20 Claims, 7 Drawing Sheets

(51) Int. Cl.
    *H04L 29/06*     (2006.01)
    *H04N 7/167*     (2011.01)
    *H04N 21/4405*     (2011.01)
    *H04N 21/4623*     (2011.01)
    *H04W 4/02*     (2009.01)
    *H04N 21/2668*     (2011.01)
    *H04W 48/04*     (2009.01)
    *H04L 29/08*     (2006.01)

(52) U.S. Cl.
    CPC ... *H04N 21/25841* (2013.01); *H04N 21/2668* (2013.01); *H04N 21/4405* (2013.01); *H04N 21/4623* (2013.01); *H04W 4/02* (2013.01); *H04L 67/18* (2013.01); *H04W 48/04* (2013.01)

(56) References Cited

U.S. PATENT DOCUMENTS

| | | | |
|---|---|---|---|
| 5,506,904 A | 4/1996 | Sheldrick et al. | |
| 6,157,719 A | 12/2000 | Wasilewski et al. | |
| 6,198,906 B1 | 3/2001 | Boetje et al. | |
| 6,442,755 B1 | 8/2002 | Lemmons et al. | |
| 6,766,169 B2 | 7/2004 | Cooper | |
| 6,772,435 B1 | 8/2004 | Thexton et al. | |
| 6,898,762 B2 | 5/2005 | Ellis et al. | |
| 6,993,782 B1* | 1/2006 | Newberry | H04N 5/4401 348/E5.097 |
| 7,266,132 B1* | 9/2007 | Liu | H04N 21/23406 348/E5.008 |
| 7,305,357 B2* | 12/2007 | Hamilton | G06Q 30/0641 348/E7.073 |
| 7,370,343 B1* | 5/2008 | Ellis | H04N 5/44543 348/E5.105 |
| 7,530,085 B2 | 5/2009 | Tsuria et al. | |
| 8,011,012 B2 | 8/2011 | Carle et al. | |
| 2002/0044658 A1 | 4/2002 | Wasilewski et al. | |
| 2002/0152318 A1* | 10/2002 | Menon | H04N 21/23435 709/231 |
| 2003/0018977 A1 | 1/2003 | McKenna | |
| 2003/0126594 A1 | 7/2003 | Tsuria et al. | |
| 2003/0154242 A1 | 8/2003 | Hayes et al. | |
| 2003/0220100 A1 | 11/2003 | McElhatten et al. | |
| 2004/0068751 A1* | 4/2004 | Basawapatna | H04N 7/10 725/117 |
| 2004/0244058 A1 | 12/2004 | Carlucci et al. | |
| 2004/0250295 A1 | 12/2004 | Lesenne et al. | |
| 2004/0261099 A1 | 12/2004 | Durden et al. | |
| 2005/0251843 A1 | 11/2005 | Walker | |
| 2006/0080198 A1 | 4/2006 | Doyle | |
| 2006/0116918 A1 | 6/2006 | Flora et al. | |
| 2006/0171390 A1 | 8/2006 | La Joie | |
| 2007/0011702 A1 | 1/2007 | Vaysman | |
| 2007/0044133 A1 | 2/2007 | Hodecker | |
| 2007/0124750 A1 | 5/2007 | Sisodia et al. | |
| 2007/0124760 A1 | 5/2007 | Novak et al. | |
| 2007/0157220 A1 | 7/2007 | Cordray et al. | |
| 2007/0198839 A1* | 8/2007 | Carle | H04L 9/083 713/176 |
| 2007/0226765 A1* | 9/2007 | Bahnck | H04H 20/103 725/63 |
| 2007/0266396 A1 | 11/2007 | Estermann | |
| 2007/0291944 A1 | 12/2007 | Wingert et al. | |
| 2008/0066095 A1 | 3/2008 | Reinoso | |
| 2008/0066103 A1 | 3/2008 | Ellis et al. | |
| 2008/0163304 A1 | 7/2008 | Ellis | |
| 2008/0168487 A1 | 7/2008 | Chow et al. | |
| 2008/0256569 A1 | 10/2008 | Rhoades et al. | |
| 2009/0064188 A1 | 3/2009 | Ospalik et al. | |
| 2009/0119696 A1 | 5/2009 | Chow et al. | |
| 2009/0187938 A1 | 7/2009 | de Heer et al. | |
| 2010/0083301 A1 | 4/2010 | Swenson | |
| 2010/0125865 A1 | 5/2010 | Ospalik et al. | |
| 2013/0081074 A1 | 3/2013 | Ospalik et al. | |

OTHER PUBLICATIONS

"DIRECTV—NFL Sunday Ticket Blackouts," DIRECTV.com, http://www.directv.com/DTVAPP/global/contentPage.jsp?assetID=900046, retrieved Feb. 16, 2007, pp. 1-2.

"Syndication Exclusivity," Wikipedia, http://en.wikipedia.org/w/index.php?title=Syndication_exclusivity&print, Jan. 17, 2007, pp. 1-3.

* cited by examiner

SYSTEM AND METHOD OF RESTRICTING ACCESS TO MEDIA CONTENT

PRIORITY CLAIM

This application is a continuation of, and claims priority to, U.S. patent application Ser. No. 11/933,502, filed Nov. 1, 2007, which is hereby incorporated by reference in its entirety.

FIELD OF THE DISCLOSURE

The present disclosure is generally related to provisioning conditional access events related to media content.

BACKGROUND

Media service providers, such as television service providers, acquire content from content providers, such as television networks, and distribute the content to subscribers. Some content is subject to access restrictions, such as blackouts and other restrictions, which media service providers must implement. Typically, conditional access events, such as blackouts, are scheduled manually after a notification indicating the event is sent from a representative of the content provider to a representative of the service provider. This can make conditional access scheduling labor-intensive and prone to error. Hence, there is a need for an improved system and method of restricting access to media content.

DETAILED DESCRIPTION OF THE DRAWINGS

A system to restrict access to content delivered via a video distribution network is disclosed and includes a service delivery platform having processing logic and memory accessible to the processing logic. The memory includes instructions executable by the processing logic to parse a control stream related to a media content channel and to derive conditional access information from the parsed control stream. The memory also includes instructions executable by the processing logic to determine, from the conditional access information, a geographic area in which access to media content associated with the media content channel is to be restricted. The memory also includes instructions executable by the processing logic to automatically schedule a conditional access event associated with the media content at a video head-end of a video distribution network that serves the geographical area.

In another particular embodiment, a method of restricting access to content delivered via a video distribution network is disclosed and includes receiving a control stream at a service delivery platform. The control stream is related to media content delivered via a video distribution network. The method also includes parsing the control stream and determining, from the parsed control stream, at least one geographical area in which access to programming associated with the video content channel is to be restricted. The method also includes automatically scheduling a conditional access event associated with the media content at at least one video head-end of the video distribution network, the at least one video head-end serving the at least one geographical area.

In another particular embodiment, a method of restricting access to content delivered via a video distribution network is disclosed and includes sending a media content stream to a super head-end associated with the video distribution network. The method also includes sending a control stream to the super head-end, where the control stream includes control data indicating at least one subscriber group for which access to media content associated with the media content stream is to be restricted. The video distribution network includes a system adapted to automatically schedule, based on the control data, a conditional access event associated with the media content at at least one video head-end of the video distribution network. The at least one video head-end serves the at least one subscriber group.

In another particular embodiment, a computer-readable medium is disclosed having processor-readable instructions executable by a processor to perform a method. The method includes parsing a control stream related to delivery of media content and deriving conditional access information from the parsed control stream. The method also includes determining, from the conditional access information, a subscriber group to whom access to media content associated with the control stream is to be restricted and automatically scheduling a conditional access event associated with the programming at at least one video head-end of a video distribution network, the at least one video head-end serving media content to the subscriber group.

Figure 1:
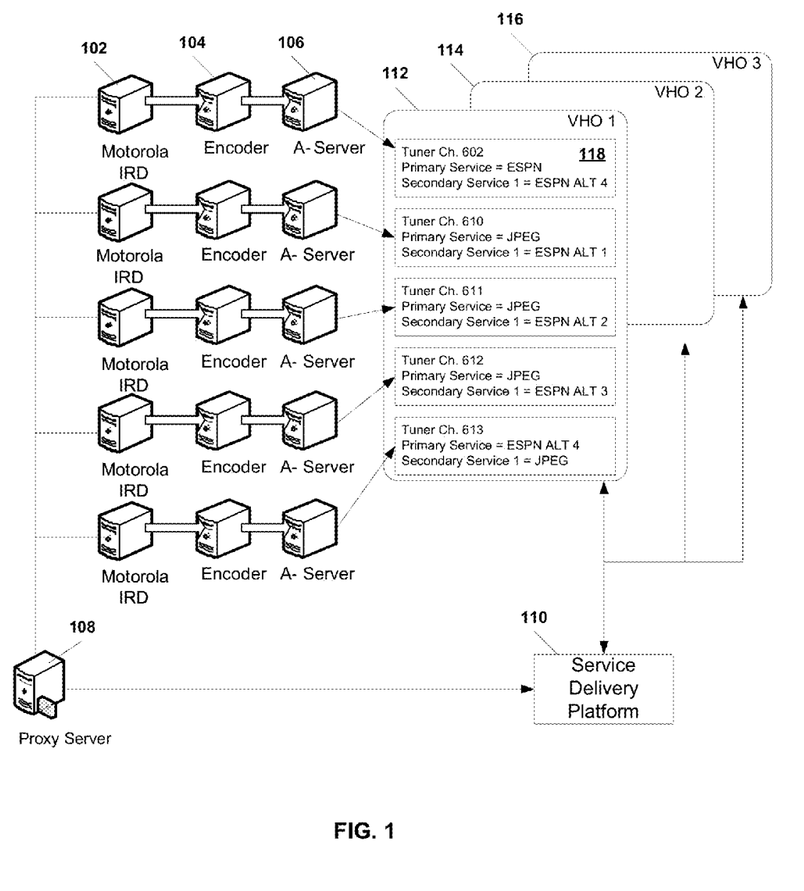
FIG. 1 is a block diagram of a particular embodiment of a system to restrict access to media content.

Referring to FIG. 1, a block diagram of a particular embodiment of a system to restrict access to media content is illustrated and designated generally 100. The system includes a plurality of integrated receiver-decoders (IRDs) 102 that communicate with a proxy server 108. Each IRD 102 also communicates with an acquisition server (A-server) 106 via an encoder 104. The proxy server 108 communicates with a service delivery platform (SDP) 110. Further, the SDP 110 communicates with a plurality of video head-ends 112-116. Each video head-end is adapted to distribute media to client devices within a particular geographical area. In one embodiment, the proxy server 108 and the SDP 110 are included in a conditional access provisioning system of a video distribution network, such as an Internet Protocol Television (IPTV) network. Alternatively, the proxy server 108 can be integrated with the SDP 110.

In a particular embodiment, each IRD 102 serves a plurality of geographic areas via the video head-ends 112-116. Each IRD 102 receives a media content stream corresponding to a particular television channel, such as a video content channel or music content channel. In an illustrative embodiment, the media content stream can be a Moving Picture Experts Group (MPEG) stream that includes video content, audio content, other media content, or a combination thereof. In addition, each IRD 102 receives a control stream related to delivery of media content received via the media content stream. Each IRD 102 is adapted to determine whether the control stream includes data indicating that the media content is subject to an access restriction, such as a blackout, a limitation on access to users associated with a particular subscription level, a limitation on access to users who pay for media content corresponding to the media content stream, or a combination thereof.

Each IRD 102 is adapted to send its control stream to the SDP 110 via the proxy server 108, when the control stream includes data indicating that the media content is subject to one or more access restrictions. Further, each IRD 102 is adapted to send the media content stream to the encoder 104. The encoder 104 is adapted to encode the content portion for transmission via the video distribution network by the A-server 106 that corresponds to the television channel.

The SDP 110 is adapted to parse the control stream into data elements and to derive conditional access information from the parsed data elements. The conditional access information can include a geographical area in which the media content is to be restricted, a subscriber group to whom the media content is to be restricted, a start time of the restriction, an end time of the restriction, a type of restriction, a channel or virtual channel affected by the restriction, or any combination thereof. In an illustrative embodiment, a geographical area can be indicated by a geographical region code (GRC). The SDP 110 is adapted to automatically schedule a conditional access event at a video head-end associated with the geographical area(s) in which the media content is to be restricted, such as the video head-end 112. The SDP 110 can call a scheduling application programming interface (API) at the video head-end 112 and interact with the scheduling API to schedule the conditional access event for main streams sent to client devices, secondary streams (e.g., picture-in-picture streams), or a combination thereof. In one embodiment, the conditional access information can indicate that the media content is to be restricted in multiple geographical areas, and the SDP 110 can be adapted to automatically schedule the conditional access event at a plurality of video head-ends, such as all of the video head-ends 112-116.

In a particular embodiment, the conditional access information can indicate that the media content subject to a restriction is to be replaced with substitute content. The conditional access information can identify the substitute content. The conditional access information can also identify the primary content (i.e., the media content subject to the restriction), a channel via which the primary content would otherwise be delivered, or a combination thereof. In one embodiment, the conditional access information can identify the primary content, the substitute content, or any combination thereof, as one or more virtual channels. The SDP 110 is adapted to determine an acquisition point of the substitute content, such as a particular acquisition server associated with a virtual channel corresponding to the substitute content.

Additionally, the SDP 110 is adapted to automatically schedule the substitution at one or more of the video head-ends 112-116. In an illustrative embodiment, the SDP 110 is adapted to create a substitution table at the video head-end(s), where the substitution table maps the primary content to the substitute content. The substitution table can also indicate the acquisition point of the substitute content, such as another acquisition server 106. For example, as shown in FIG. 1, a first substitution table 118 for a first channel 602 can indicate that a primary service (e.g., ESPN) provided by a first acquisition server is to be replaced with a secondary service (e.g., ESPN ALT 4) provided by a fifth acquisition server. In another embodiment, the substitution table can map a start time, end time, and channel to the substitute content.

In a particular embodiment, the SDP 110 is adapted to receive second control stream data related to television programming or other media content that is subject to the scheduled conditional access event. The SDP 110 parses the second control stream data and derives conditional access update information from the parsed second control stream data. The conditional access update information indicates that a previously scheduled conditional access event is to be deleted or modified. For example, the conditional access update information can indicate that a blackout is no longer applicable to a particular television program or that certain users can receive a blacked out program. In another example, the update information can indicate that a start time of the blackout, an end time of the blackout, substitute content to be delivered during the blackout, one or more geographical areas to which the blackout applies, or any combination thereof, have been updated.

The SDP 110 is adapted to identify a previously scheduled conditional access event to which the update information applies. Further, the SDP 110 is adapted to automatically modify or delete the scheduled conditional access event at one or more of the video head-ends 112-116 at which the conditional access event was scheduled. In a particular embodiment, the SDP 110 logs receipt of the update information. For instance, a SDP database can store data indicating that update information has been received, a time at which the update information was received, at least a portion of the contents of the update information, or a combination thereof.

In an illustrative embodiment, the SDP 110 can be adapted to determine whether the update information derived from the second control stream data indicates that substitute content associated with the conditional access event is to be modified or deleted (i.e., when the conditional access event no longer applies). If the substitute content is to be modified or deleted, the SDP 110 can be adapted to automatically call a substitution application programming interface (API) at one or more of the video head-ends 112-116 to modify or delete a substitution table associated with the conditional access event.

Figure 2:
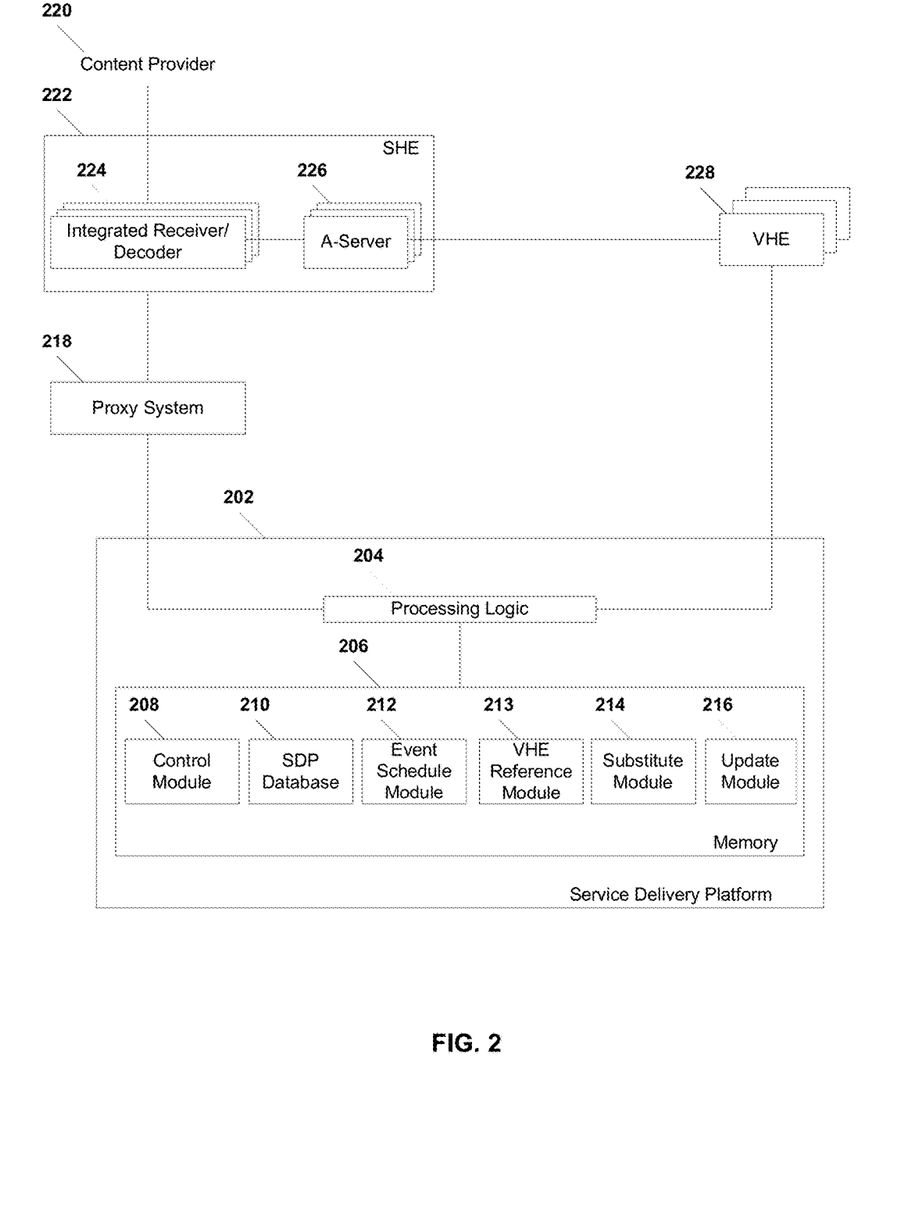
FIG. 2 is a block diagram of a second particular embodiment of a system to restrict access to media content.

Referring to FIG. 2, a block diagram of a second particular embodiment of a system to restrict access to media content is illustrated and designated generally 200. The system includes a service delivery platform (SDP) 202 that communicates with a video super head end (SHE) 222 via a proxy system 218. Alternatively, the proxy system 218 can be integrated with the SDP 202. The SHE 222 communicates with at least one content provider 220. Further, the SDP 202 communicates with a plurality of VHEs 228. Each of the VHEs 228 serves media content to client devices of a video distribution system within a particular geographical area.

In one embodiment, the content provider 220 sends a media content stream to the SHE 222. If the content provider 220 determines that the media content is subject to a conditional access restriction, the content provider 220 also sends a control stream to the SHE 222. The control stream includes parsable control data indicating at least one geographical area or other subscriber group for which access to the media content is to be restricted.

In an illustrative embodiment, the SHE 222 includes a plurality of integrated receiver-decoders (IRDs) 224. Each IRD 224 is coupled to one of a plurality of acquisition servers (A-servers) 226. In a particular embodiment, each IRD 224 is adapted to receive a media content stream associated with a different channel or virtual channel from a content provider, such as the content provider 220, and to deliver corresponding media content to client devices via the video distribution system. In an illustrative embodiment, the media content stream is a Moving Picture Experts Group (MPEG) stream. Each IRD 224 sends media content associated with a received media content stream to an A-server 226 to which it is coupled. Each A-server 226 can distribute the media content to one or more of the VHEs 228 for delivery to client devices in one of a plurality of geographical areas served by the VHEs 228.

Further, each IRD 224 is adapted to receive a control stream related to delivery of media content received via its media content stream. Each IRD 224 is adapted to determine whether the control stream includes data indicating that the media content associated with the media content stream is subject to one or more access restrictions, such as a blackout, a limitation on access to users associated with a particular subscription level, a limitation on access to users who pay for media content corresponding to the media content stream, or a combination thereof. The IRD 224 is adapted to send the control stream to the SDP 202 via the proxy system 218, when the control stream includes data indicating that the media content is subject to one or more access restrictions.

The SDP 202 includes processing logic 204 and memory 206 accessible to the processing logic. The memory 206 includes a plurality of modules 208-216 that are adapted to provide various functions of the SDP 202 with respect to automatically provisioning conditional access with respect to media content. The modules 208-216 can include data stores; hardware logic; instructions executable by the processing logic 204, such as instructions included in one or more computer programs or operating systems; or any combination thereof.

For example, the memory 206 includes a control module 208 that is executable by the processing logic 204 to receive control streams from the IRDs 224 via the proxy system 218. Further, the control module 208 is executable by the processing logic 204 to parse each control stream and to derive conditional access information from the parsed control stream. The conditional access information includes a geographical area in which the media content is to be restricted, a subscriber group to which the media content is to be restricted, a start time of the restriction, an end time of the restriction, a type of restriction, a channel affected by the restriction, substitute content to replace the restricted media content, or any combination thereof. In an illustrative embodiment, the geographical area can be indicated by a geographical region code (GRC).

The memory 206 includes a SDP database 210 to log receipt of control stream data indicating a conditional access event. For instance, the SDP database 210 can store data indicating that the control stream data was received, a time at which the control stream data was received, at least a portion of the conditional access information, or any combination thereof.

The memory 206 includes an event schedule module 212 that is executable by the processing logic 204 to automatically schedule a conditional access event at each video head-end 228 associated with a geographical area in which the media content is to be restricted. In one embodiment, the conditional access information can indicate that the media content is to be restricted in multiple geographical areas, and the event schedule module 212 that is executable by the processing logic 204 to automatically schedule the conditional access event at a plurality of video head-ends 228. For example, the media content can be subject to a blackout in multiple geographical areas. In another embodiment, the event schedule module 212 can be executable by the processing logic 204 to schedule a first type of conditional access event at a first VHE and a second type of conditional access event at a second VHE. For instance, the media content can be subject to a blackout in a first geographical area and restricted to paying users or users associated with a certain subscription level in another geographical area. In a particular embodiment, the memory 206 can include a VHE reference module 213 to store data indicating which of the VHEs 228 is associated with a particular geographical area.

In a particular embodiment, the conditional access information can indicate that the media content subject to a restriction is to be replaced with substitute content. The conditional access information can identify the substitute content. The conditional access information can also identify the primary content (i.e., the media content subject to the restriction), a channel via which the primary content would otherwise be delivered, or a combination thereof. The memory 206 includes a substitute module 214 that is executable by the processing logic 204 to determine an acquisition point of the substitute content, such as a particular acquisition server, and to schedule the substitution at one or more of the video head-ends 228.

In an illustrative embodiment, the substitute module 214 is executable by the processing logic 204 to create a substitution table at the video head-end(s), where the substitution table maps the primary content to the substitute content. The substitution table can also indicate the acquisition point of the substitute content, such as a particular acquisition server. In another embodiment, the substitution table can map a start time, end time, and channel to the substitute content.

In a particular embodiment, the control module 208 is executable by the processing logic 204 to receive second control stream data related to television programming or other media content that is subject to the scheduled conditional access event. The control module 208 is executable by the processing logic 204 to parse the second control stream data and derive conditional access update information from the parsed second control stream data. The conditional access update information includes data indicating that a previously scheduled conditional access event is to be deleted or modified. For example, the conditional access update information can indicate that a blackout is no longer applicable to a particular television program or that certain users can receive a blacked out program. In another example, the update information can indicate that a start time of the blackout, an end time of the blackout, substitute content to be delivered during the blackout, one or more geographical areas to which the blackout applies, or any combination thereof, have been updated.

The memory 206 includes an update module 216 that is executable by the processing logic 204 to identify a previously scheduled conditional access event to which the update information applies. For instance, the previously scheduled conditional access event can be retrieved from the SDP database, or the conditional access update information can indicate the previously scheduled conditional access event. The update module 216 is executable by the processing logic 204 to automatically modify or delete the scheduled conditional access event at one or more of the video head-ends 228 at which the conditional access event was scheduled. In a particular embodiment, the SDP database 210 logs receipt of the update information. For instance, the SDP database 210 can store data indicating that update information has been received, when the update information was received, at least a portion of the contents of the update information, or any combination thereof.

In an illustrative embodiment, the control module 208 is executable by the processing logic 204 to determine whether the update information derived from the second control stream data indicates that substitute content associated with the conditional access event is to be modified or deleted (i.e., when the conditional access event no longer applies). If the substitute content is to be modified or deleted, the update module 216 is executable by the processing logic 204 to automatically call a substitution application programming interface (API) at one or more of the VHEs 228 to modify or delete a substitution table associated with the conditional access event.

Figure 3:
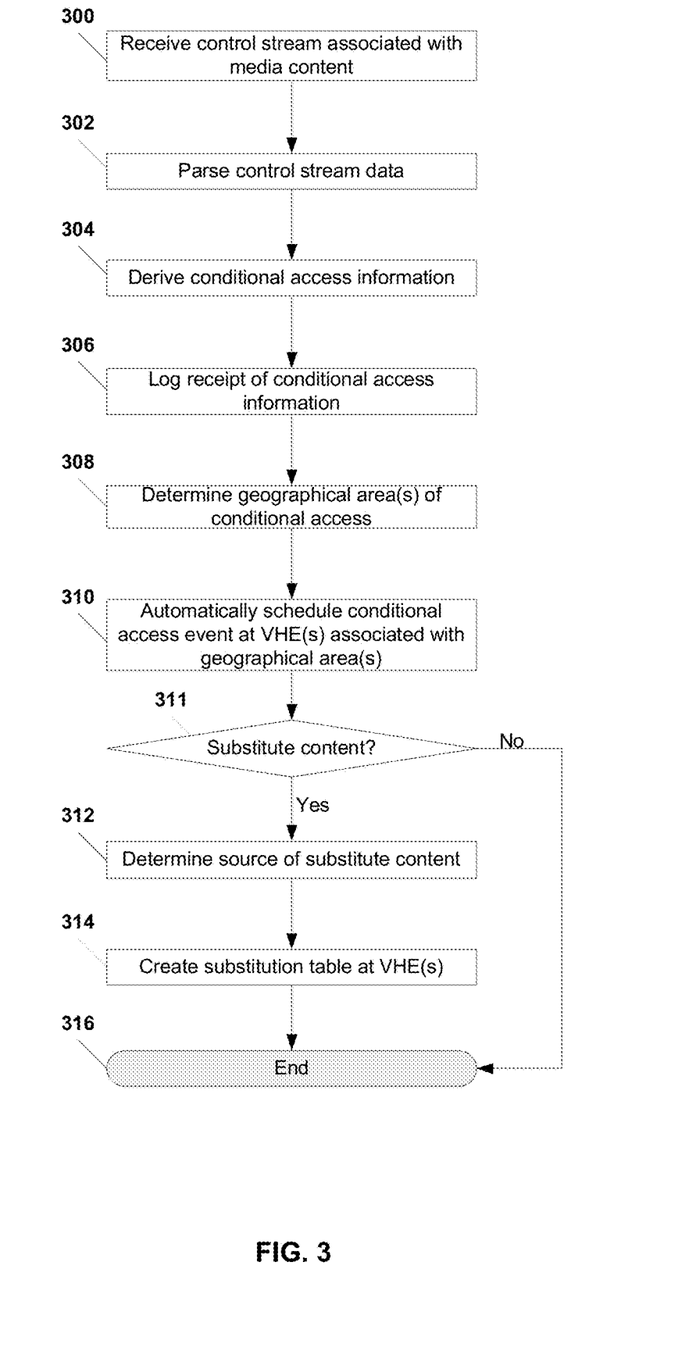
FIG. 3 is a flow diagram of a particular embodiment of a method of restricting access to media content.

Referring to FIG. 3, a flow diagram of a particular embodiment of a method of restricting access to media content is illustrated. At block 300, a conditional access provisioning system receives a control stream related to the delivery of television programming or other media content. In an illustrative example, the control stream can be received from a super head-end of an Internet Protocol Television network at a service delivery platform (SDP) or other device of the conditional access provisioning system. Moving to block 302, the conditional access provisioning system parses the control stream.

Proceeding to block 304, the conditional access provisioning system derives conditional access information from the parsed control stream. The conditional access information includes data indicating that television programming or other media content associated with the media content stream is subject to a conditional access restriction, such as a blackout, a limitation on access to certain users, or a combination thereof, within at least one geographical area. In one embodiment, the media content can be subject to a plurality of conditional access restrictions within a plurality of geographical areas. For example, the media content can be subject to a blackout in multiple geographical areas. In another example, the media content can be subject to a blackout in a first geographical area and restricted to paying users or users associated with a certain subscription level in another geographical area. The control stream can also indicate a start time of the conditional access restriction, an end time of the conditional access restriction, a channel affected by the conditional access restriction, substitute content to be delivered via the affected channel between the start time and end time of the conditional access restriction, or any combination thereof.

Continuing to block 306, the conditional access provisioning system logs receipt of the conditional access information. For instance, a SDP database can store data indicating that the control stream data was received, a time at which the control stream data was received, at least a portion of the conditional access information, or any combination thereof.

Advancing to block 308, the conditional access provisioning system determines the geographical area(s) in which the media content associated with the media content stream is subject to the conditional access restriction(s). For example, the conditional access provisioning system can determine the geographical area(s) based on one or more geographical region codes (GRCs) included with the conditional access information. At block 310, the conditional access provisioning system automatically schedules a conditional access event at each video head-end that serves a geographical area in which the media content is subject to a conditional access restriction. For example, the conditional access provisioning system can automatically call and interact with a scheduling application programming interface (API) to schedule the conditional access event. In one embodiment, the conditional access provisioning system schedules a same type of conditional access event at each video head-end. In another embodiment, the conditional access provisioning system schedules one type of conditional access event at one or more first video head-ends and schedules a second type of conditional access event at one or more second video head-ends.

Moving to decision node 311, the conditional access provisioning system determines whether the conditional access information derived from the control stream indicates that substitute content is to be delivered in replace of the media content associated with the conditional access event. If substitute content is to be delivered, the method proceeds to block 312, and the conditional access provisioning system determines a source of the substitute content. The source can be determined from the conditional access information included with the control stream or from data stored at the conditional access provisioning system. The method continues to block 314, and the conditional access provisioning system creates a substitution table at each video head-end where a conditional access event has been scheduled for the media content. In one example, the conditional access provisioning system automatically calls and interacts with a substitution API to create the substitution table. The method terminates at 316.

Figure 4:
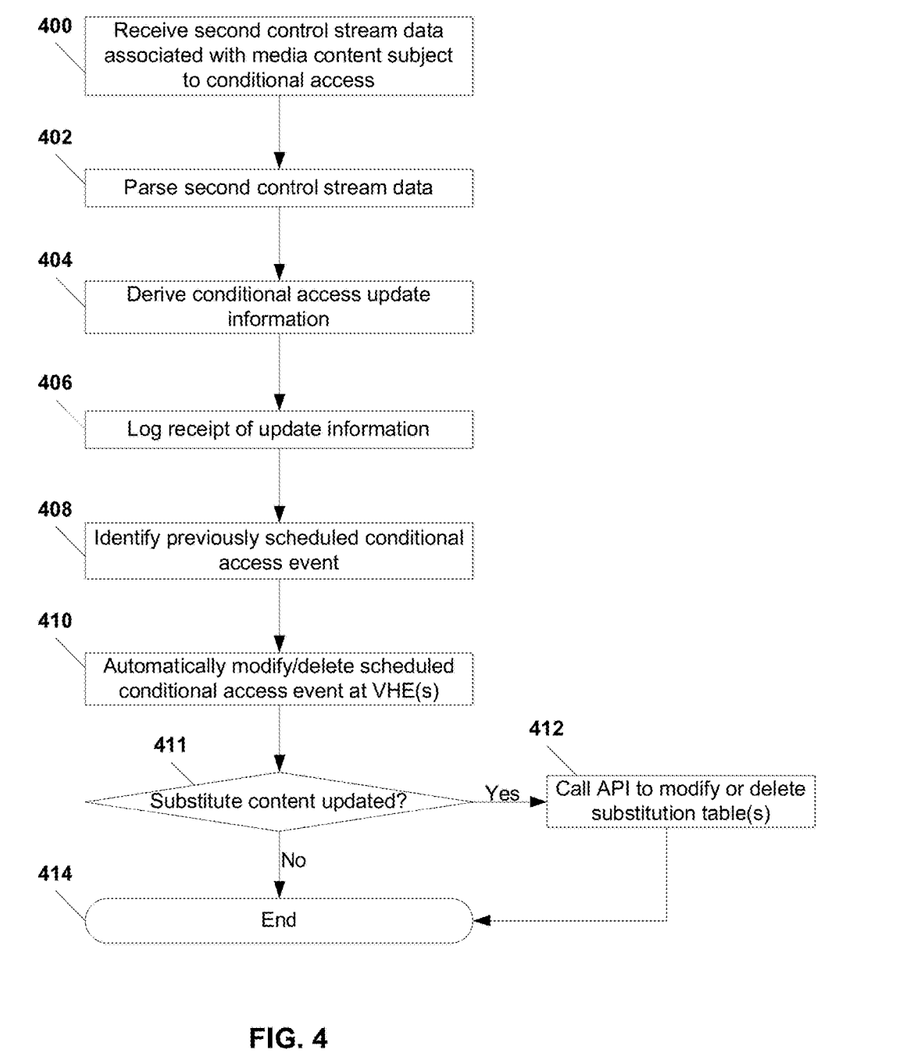
FIG. 4 is a flow diagram of a second particular embodiment of a method of restricting access to media content.

Referring to FIG. 4, a flow diagram of a second particular embodiment of a method of restricting access to media content is illustrated. At block 400, a conditional access provisioning system receives second control stream data related to television programming or other media content that is subject to conditional access. In an illustrative example, the second control stream data can be received from a super head-end of an Internet Protocol Television (IPTV) network at a service delivery platform (SDP) or other device of the conditional access provisioning system. Moving to block 402, the conditional access provisioning system parses the second control stream data.

Proceeding to block 404, the conditional access provisioning system derives conditional access update information from the parsed control stream. The conditional access update information includes data indicating that a previously scheduled conditional access event is to be deleted or modified. For example, the conditional access update information can indicate that a blackout is no longer applicable to a particular television program or that certain users can receive a blacked out program. In another example, the update information can indicate that a start time of the blackout, an end time of the blackout, substitute content to be delivered during the blackout, one or more geographical areas to which the blackout applies, or any combination thereof, have been updated.

Continuing to block 406, the conditional access provisioning system logs receipt of the update information. For instance, a SDP database can store data indicating that update information has been received, a time at which the update information was received, at least a portion of the contents of the update information, or a combination thereof. Advancing to block 408, the conditional access provisioning system identifies a previously scheduled conditional access event to which the update information applies.

At block 410, the conditional access provisioning system automatically modifies or deletes the scheduled conditional access event at one or more video head-ends where the conditional access event was previously scheduled. Moving to decision node 411, the conditional access provisioning system determines whether the update information derived from the control stream indicates that substitute content associated with the conditional access event is to be modified or deleted (i.e., when the conditional access event no longer applies). If the substitute content is to be modified or deleted, the method proceeds to block 412, and the conditional access provisioning system automatically calls and interacts with a substitution application programming interface (API) at each video head-end where the conditional access event was scheduled, to modify or delete a substitution table associated with the conditional access event. The method terminates at 414.

Figure 5:
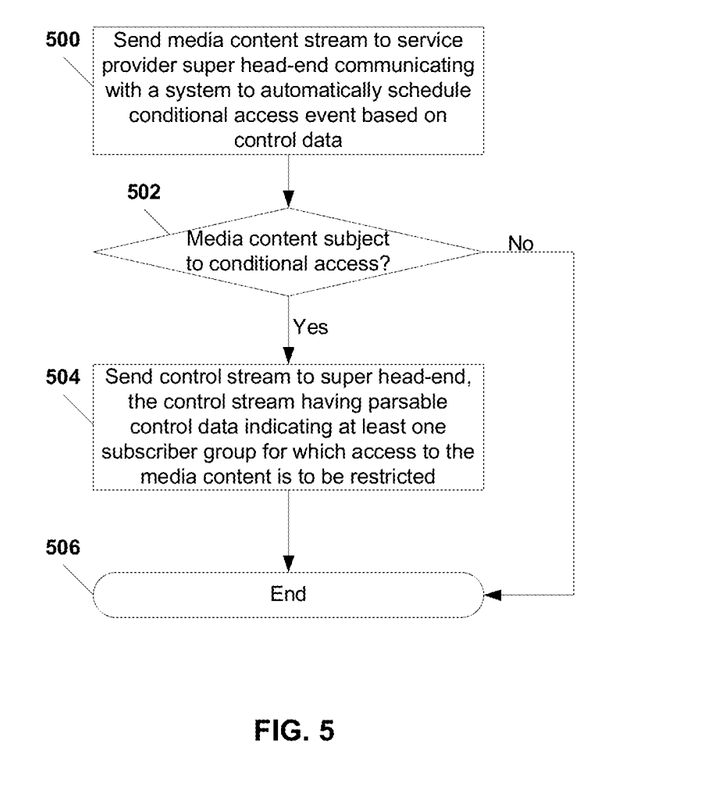
FIG. 5 is a flow diagram of a third particular embodiment of a method of restricting access to media content.

Referring to FIG. 5, a third particular embodiment of a method of restricting access to content is illustrated. At block 500, a content provider sends a media content stream to a super head-end system of a media content service provider, such as an Internet Protocol Television (IPTV) service provider. The super head-end of the media content service provider communicates with a system associated with the video distribution network, such as a service delivery platform, which is adapted to automatically schedule conditional access events based on control data. Moving to decision node 502, the content provider determines whether the media content associated with the media content stream is subject to conditional access. For instance, the content provider can determine that at least one geographical area or other subscriber group is prohibited from viewing the media content, such as a sports game, due to a blackout restriction. If the content provider determines that the media content is subject to a conditional access restriction, the method proceeds to block 504, and the content provider sends a control stream to the super head-end. The control stream includes parsable control data indicating at least one subscriber group for which access to the media content is to be restricted. The method terminates at 506. In a particular embodiment, the system communicating with the super head-end can parse the control stream and automatically schedule a conditional access event at one or more video head-ends serving the subscriber group(s) for which the media content is subject to conditional access.

In some embodiments, the methods disclosed herein can be performed as described. In alternative embodiments, aspects of the methods can be performed in alternative sequences or simultaneously. For example, a media content provider can determine whether media content is subject to conditional access before sending the media content stream. In another example, the media content provider can send the media content stream and the control stream simultaneously.

Figure 6:
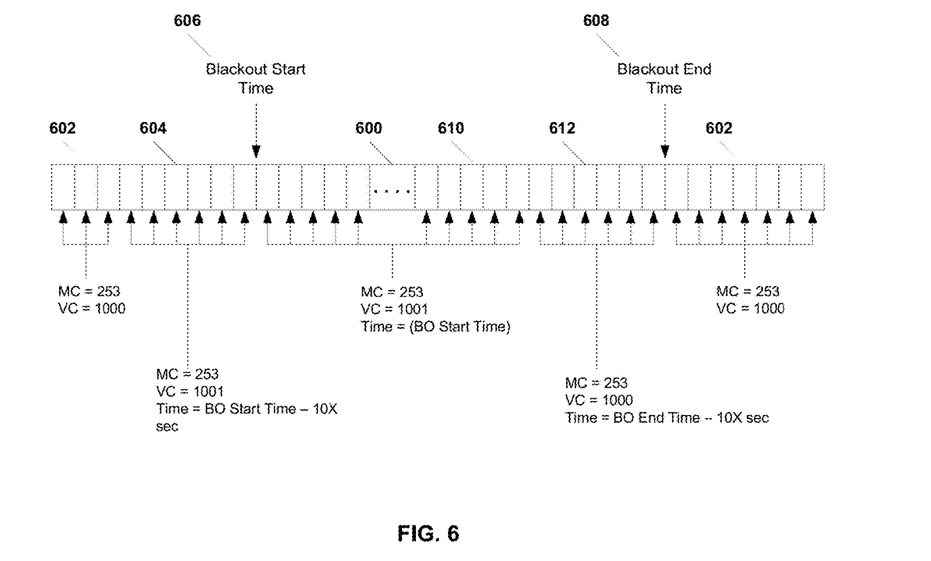
FIG. 6 is a general diagram of an illustrative embodiment of a video stream.

Referring to FIG. 6, a general diagram of an illustrative embodiment of a control stream is illustrated and designated generally 600. The control stream 600 includes a plurality of retune messages sent, for example, at ten second intervals. For example, the control stream 600 includes one or more first retune messages 602 indicating that primary media content, such as media content associated with a virtual channel 1000, is to be delivered to a geographic area corresponding to multicast address 253. In one embodiment, one or more particular integrated receiver-decoders (IRDs) at a video super head-end can be associated with multicast address 253, where the IRD(s) are allocated to the geographic area.

In addition, the control stream 600 includes a plurality of second retune messages 604 indicating that the geographic area corresponding to multicast address 253 is to receive substitute content associated with a second virtual channel 1001, beginning at a blackout start time 606 and ending at a blackout end time 608. In one embodiment, the second retune messages can occur within the control stream at ten-second intervals, beginning one minute prior to the blackout start time 606.

During a period between the blackout start time 606 and the blackout end time 608, a plurality of third retune messages 610 indicate that the geographic area corresponding to multicast address 253 is to receive media content associated with the virtual channel 1001. In addition, fourth retune messages 612 indicate that the geographic area corresponding to multicast address 253 is to begin receiving media content associated with virtual channel 1000 at the blackout end time 608. The fourth retune messages can occur within the control stream, for example, at ten second intervals beginning one minute before the blackout end time 608.

In conjunction with the configuration of structure provided herein, a system and method of restricting access to media content are provided in which automated, software-based scheduling and execution of blackouts and other conditional access events occur based on a control stream that is received and parsed at a service delivery platform or other conditional access provisioning system of a video distribution network, such as an Internet Protocol Television (IPTV) network. In other embodiments, the system and method can be applied to a cable network, a satellite dish network, or other video distribution network adapted to deliver video traffic via similar architectures.

Figure 7:
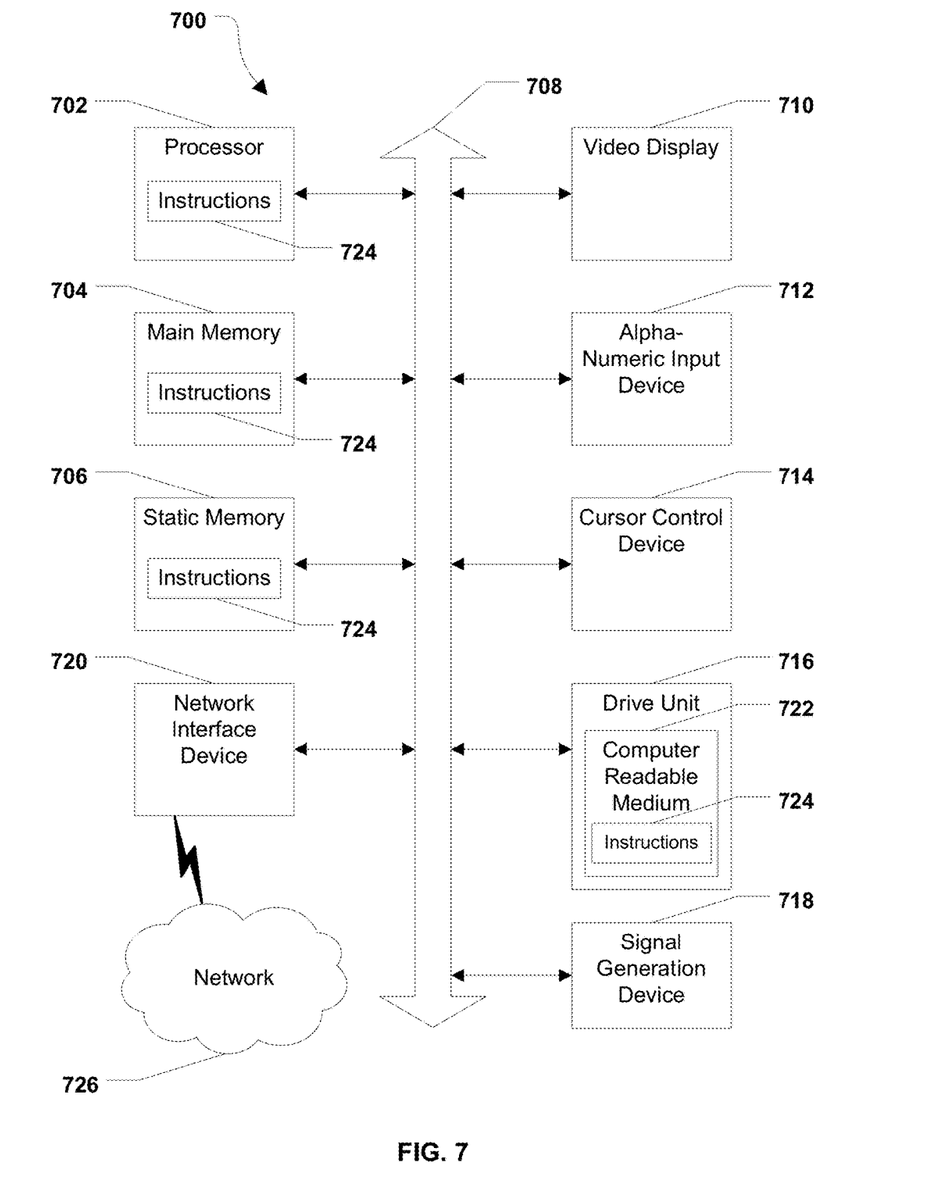
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, which can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a service delivery platform from a first video source, a control stream associated with primary media content delivered via a video distribution network, wherein the control stream includes first conditional access information associated with a first geographic area and second conditional access information associated with a second geographic area, and wherein the first conditional access information indicates a restriction of the primary media content;
identifying a first particular second video source from a plurality of second video sources, the first particular second video source identified based on the first geographic area;
sending a first substitution table entry from the service delivery platform to the first particular second video source, but not to at least one other video source of the plurality of second video sources, the first substitution table entry based on the first conditional access information, wherein the first substitution table entry indicates first substitute media content to be output, by the first particular second video source in response to the restriction, in place of the primary media content;
identifying a second particular second video source from the plurality of second video sources, the second particular second video source identified based on the second geographic area; and
sending a second substitution table entry from the service delivery platform to the second particular second video source, the second substitution table entry based on the second conditional access information, wherein the second substitution table entry indicates second substitute media content to be output, by the second particular second video source in response to the restriction, in place of the primary media content.

2. The method of claim 1, wherein the video distribution network comprises a television network.

3. The method of claim 1, wherein the first substitution table entry includes a channel number corresponding to the restriction, a first identifier corresponding to the first video source, and a second identifier corresponding to a third video source that provides the first substitute media content.

4. The method of claim 1, further comprising:
receiving, at the service delivery platform, an update command associated with the video distribution network, wherein the update command includes updated conditional access information; and
in response to the update command, sending an updated substitution table entry to the first particular second video source, the updated substitution table entry based on the updated conditional access information.

5. The method of claim 1, wherein the first substitution table entry causes the first particular second video source to create a conditional access event associated with the first conditional access information at the first particular second video source, wherein the conditional access event is associated with a time period corresponding to the primary media content being inaccessible, and wherein data indicating the conditional access event is stored at the first particular second video source.

6. The method of claim 5, wherein the first particular second video source restricts access by subscribers to the primary media content based on the conditional access event.

7. The method of claim 5, further comprising:
receiving, at the service delivery platform, a delete command indicating that the conditional access event is to be deleted; and
causing the conditional access event to be deleted at the first particular second video source, wherein the conditional access event is deleted by removing the data indicating the conditional access event from the first particular second video source.

8. The method of claim 1, wherein the service delivery platform does not receive the primary media content.

9. A system comprising:
a processor; and
a memory including instructions that, when executed by the processor, cause the processor to perform operations including:
receiving, from a first video source, a control stream associated with primary media content delivered via a video distribution network, wherein the control stream includes first conditional access information associated with a first geographic area and second conditional access information associated with a second geographic area, and wherein the first conditional access information of the control stream indicates a restriction of the primary media content;
identifying a first particular second video source from a plurality of second video sources, the first particular second video source identified based on the first geographic area;
sending a first substitution table entry to the first particular second video source, but not to at least one other video source of the plurality of second video sources, the first substitution table entry created based on the first conditional access information, wherein the first substitution table entry indicates first substitute media content to be output, by the first particular second video source in response to the restriction, in place of the primary media content;
identifying a second particular second video source from the plurality of second video sources, the second particular second video source identified based on the second geographic area; and
sending a second substitution table entry to the second particular second video source, the second substitution table entry based on the second conditional access information, wherein the second substitution table entry indicates second substitute media content to be output, by the second particular second video source in response to the restriction, in place of the primary media content.

10. The system of claim 9, wherein the operations further include receiving the control stream from an integrated receiver-decoder of the first video source.

11. The system of claim 9, wherein the operations further include scheduling a conditional access event at the first particular second video source based on the first substitution table entry, wherein scheduling the conditional access event includes storing data indicating the conditional access event to the first particular second video source, and wherein the conditional access event corresponds to a time period when the primary media content is inaccessible.

12. The system of claim 9, wherein the video distribution network is a television network.

13. The system of claim 9, wherein the processor and the memory are included in a service delivery platform.

14. The system of claim 13, wherein the service delivery platform is adapted to receive the control stream via a proxy system, and wherein the service delivery platform and the proxy system are included in a conditional access provisioning system.

15. The system of claim 9, wherein the memory includes a database to log receipt of the first conditional access information.

16. The system of claim 9, wherein the first conditional access information indicates the first geographic area, a start time for a conditional access event, an end time for the conditional access event, the primary media content, the first substitute media content, or any combination thereof.

17. A computer-readable storage device including instructions that, when executed by a processor, cause the processor to perform operations including:
    receiving, from a first video source, a control stream associated with primary media content delivered via a video distribution network, wherein the control stream includes first conditional access information associated with a first geographic area and second conditional access information associated with a second geographic area, and wherein the first conditional access information of the control stream indicates a restriction of the primary media content;
    identifying a first particular second video source from a plurality of second video sources, the first particular second video source identified based on the first geographic area;
    sending a first substitution table entry to the first particular second video source, but not to at least one other video source of the plurality of second video sources, the first substitution table entry created based on the first conditional access information, wherein the first substitution table entry indicates first substitute media content to be output, by the first particular second video source in response to the restriction, in place of the primary media content;
    identifying a second particular second video source from the plurality of second video sources, the second particular second video source identified based on the second geographic area; and
    sending a second substitution table entry to the second particular second video source, the second substitution table entry based on the second conditional access information, wherein the second substitution table entry indicates second substitute media content to be output, by the second particular second video source in response to the restriction, in place of the primary media content.

18. The computer-readable storage device of claim 17, wherein the primary media content, the first substitute media content, or a combination thereof, are indicated by a virtual channel.

19. The computer-readable storage device of claim 17, wherein the first video source includes a video super head end, wherein the plurality of second video sources includes a plurality of video head ends, and wherein each of the plurality of video head ends is associated with a corresponding geographic region.

20. The computer-readable storage device of claim 17, wherein the restriction of the primary media content is based on a third geographic area associated with the first particular second video source.

* * * * *